United States Patent [19]

Lachman

[11] Patent Number: 5,053,092
[45] Date of Patent: Oct. 1, 1991

[54] METHOD FOR PRODUCING A SINTERABLE EXTRUDED LAMINATED ARTICLE

[75] Inventor: Irwin M. Lachman, Corning, N.Y.

[73] Assignee: Corning Incorporated, Corning, N.Y.

[21] Appl. No.: 170,783

[22] Filed: Mar. 21, 1988

[51] Int. Cl.⁵ .................... B01J 20/28; B01J 35/00; B32B 18/00

[52] U.S. Cl. ................. 156/89; 156/244.11; 156/244.12; 156/244.14; 264/60; 264/171; 264/172; 502/64; 502/263; 502/302; 502/324; 502/355; 502/439; 502/524; 502/527

[58] Field of Search ............. 156/89, 244.11, 244.12, 156/244.14; 264/60, 171, 172, 177.11, 177.12, 177.17, 177.19, 210.1; 502/64, 263, 302, 324, 355, 439, 524, 527

[56] References Cited

U.S. PATENT DOCUMENTS

| | | | |
|---|---|---|---|
| 1,538,818 | 1/1939 | McIntosh et al. | 264/61 |
| 3,444,925 | 5/1969 | Johnson | 165/166 |
| 3,505,158 | 4/1970 | Murray | 264/60 |
| 3,528,400 | 9/1970 | Norwalk | 126/144 |
| 3,713,877 | 1/1973 | Kirchner et al. | 117/123 A |
| 3,790,654 | 2/1974 | Begley | 264/177.12 |
| 4,253,992 | 3/1981 | Soejima et al. | 156/89 |
| 4,428,895 | 1/1984 | Blesch et al. | 264/60 |
| 4,631,268 | 12/1986 | Lachman et al. | 502/439 |

OTHER PUBLICATIONS

Chartier et al., "Mechanical Behaviour of Alumina and Zirconia-Alumina Laminated Composites", paper presented at Tokyo 3rd International Conference on the Science and Technology of Zirconia, 9/9-9/11/86, Tokyo, Japan.

Primary Examiner—Caleb Weston
Attorney, Agent, or Firm—Dianne B. Elderkin; Richard N. Wardell

[57] ABSTRACT

Laminated extruded thermal shock resistant composite articles formed from sinterable particulate or powdered materials such as ceramics are disclosed. The laminated extruded composite articles have multiple discrete layers of at least a first and second sintered material, where the first and second sintered materials are different and are selected from high strength sintered particulate or powdered materials and where the layers of each of said first and second sintered materials are substantially uniformly distributed throughout the article.

16 Claims, 7 Drawing Sheets

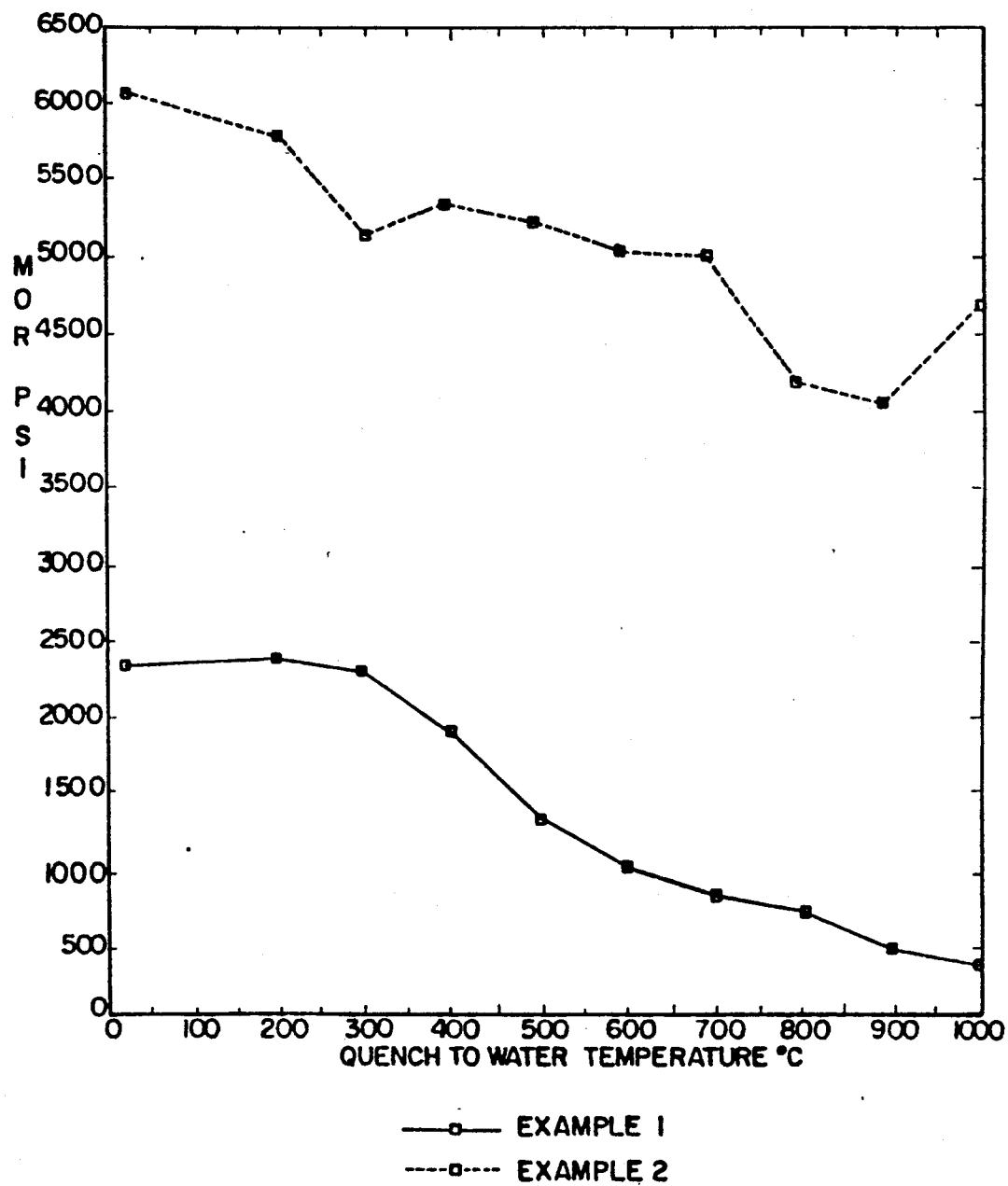

METHOD FOR PRODUCING A SINTERABLE EXTRUDED LAMINATED ARTICLE

BACKGROUND OF THE INVENTION

This invention relates to laminated extruded thermal shock resistant articles formed from sinterable particulate or powdered materials and to the method of making such articles.

Due to properties such as high strength, temperature and chemical stability, and electrical and thermal insulating properties, ceramics are widely used engineering materials. In many applications, such as cookware, spark plug insulators, abrasive wheels, refractory linings, applications in the chemical process industries, heat exchangers, and high temperature automotive substrates, ceramic materials can be exposed to rapid changes in temperature or large thermal gradients. To be useful, the materials should desirably exhibit good thermal shock resistance, i.e., must maintain their strength after thermal shocking.

Thermal shock resistance is usually measured by quenching from a high temperature and by measuring the strength degradation (as compared to measurements made on samples not yet subjected to thermal shock). A commonly used test for thermal shock resistance is that described by Hasselman. See, e.g., Hasselman, "Strength Behavior of Polycrystalline Alumina Subjected to Thermal Shock," *J. Am. Ceramic Soc.*, Vol. 53, No. 9, pp. 490-495, Sept. 1970, and Larson and Hasselman, "Comparative Behavior of High-Alumina Refractories Subjected to Sudden Heating and Cooling", *Transactions and Journal of the British Ceramic Society*, (74) No. 2, pp. 59-65, Mar./Apr. 1975. It is recognized that all ceramic materials, as they are quenched from successively higher temperatures, will undergo cracking and exhibit strength degradation. Preferably, the ceramic materials will, upon being quenched from successively higher temperatures, exhibit stable crack propagation and, thus, a gradual and predictable decrease in strength. For the purpose of this invention, materials exhibiting such properties are deemed to exhibit good thermal shock resistance. There are ceramic materials, however, which undergo rapid crack propagation after quenching from a certain temperature and exhibit what is termed a "catastrophic" decrease in strength. FIGS. 1a and 1b present graphs of schematic thermal shock test results, the first graph illustrating the catastrophic decrease in strength exhibited by a material which undergoes rapid crack propagation, and the second graph illustrating the gradual decrease in strength exhibited by a material which undergoes stable crack propagation and which is thus deemed to possess good thermal shock resistance. Clearly, materials which undergo rapid crack propagation are not suited for applications in which they will be exposed to rapid changes in temperature.

Ceramic materials in general do not have particularly good thermal shock resistance because of their brittle nature, and a need exists for methods to improve the thermal shock resistance properties of these valuable materials.

SUMMARY OF THE INVENTION

The present invention relates to articles of high strength sinterable materials, such as ceramics, which exhibit good thermal shock resistance. More specifically, the articles of this invention comprise high strength sintered extruded laminated bodies having multiple discrete layers of at least a first and second sintered material, where said first and second sintered materials are different and are selected from high strength sintered inorganic particulate or powdered materials and wherein said layers of each of said first and second sintered materials are substantially uniformly distributed throughout the body. In the preferred embodiment of the invention, the ratio of either of said layers of first or second sintered materials to the other is no greater than about 1.2:1. Generally, however, the ratio of either of said layers of first or second sintered materials to the other may be up to 10:1.

This invention also relates to a method of producing such sintered laminated extruded articles The method of this invention comprises (a) providing first multiple bodies comprising a mixture of a first sinterable material and a plasticizing-/bonding agent for said material;

(b) providing second multiple bodies comprising a mixture of a second sinterable material and a plasticizing/bonding agent for said material;

(c) intermingling said first and second multiple bodies to form an assembly thereof and wherein said first and second multiple bodies are substantially uniformly distributed throughout the composite;

(d) passing the assembled body through a die to form an extruded laminated composite article in a desired shape; and (e) heating said extruded laminated composite article to sinter the particulate or powdered materials therein.

In addition, this invention relates to the green articles which are sintered to form the high strength extruded laminated articles above-described, and to the method of making such green articles. The term "green" is used in the art and in this application to refer to the state of a formed body or piece made of sinterable powder or particulate material that has not yet been fired to the sintered state. The green body may have been heated to dry it by evaporating or volatilizing plasticizing liquid or vehicle and perhaps also to burn out volatile organic or decomposable binders mixed with the sinterable powder to render it adequately plastically formable and/or sufficiently coherent (having green strength) so that the body can be handled without deformation and other damage.

Tests indicate that the sintered articles of this invention exhibit good thermal shock resistance. It is believed that this good thermal shock resistance is the result of several factors. First, the presence of the discontinuities in the sintered article resulting from the presence of a plurality of phases is believed to prevent crack growth and relieve stresses. Second, it is known that microcracking enhances the thermal shock resistance of an article based on ceramics by lowering the modulus of elasticity of the article Microcracking is encouraged when the materials in the different phases in the articles of this invention possess different thermal expansions and firing shrinkages. Third, the plurality of phases arranged in a laminated fashion results in each of the phases being substantially discontinuous.

BRIEF DESCRIPTION OF THE DRAWINGS

FIG. 1a illustrates the catastrophic decrease in strength exhibited by a material which undergoes rapid crack propagation, and FIG. 1b illustrates the gradual decrease in strength exhibited by a material which undergoes stable crack propagation

FIG. 4 is a graph presenting the results of Hasselman thermal shock testing of Examples 1 and 2.

DETAILED DESCRIPTION OF THE INVENTION

Figure 1A:
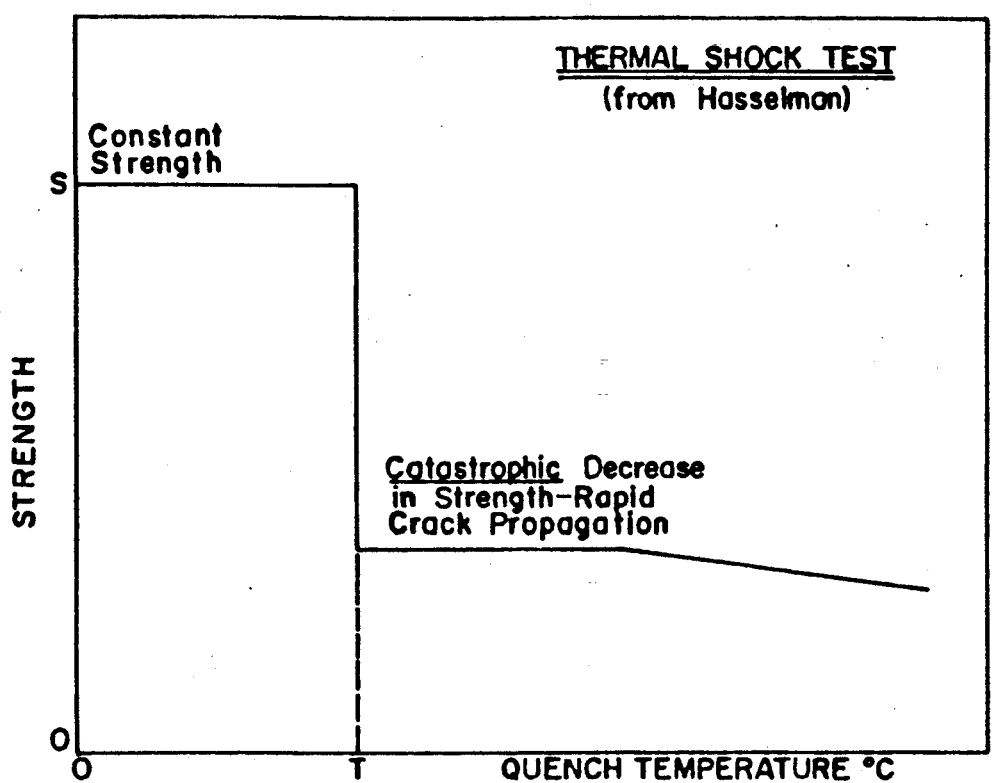
FIGS. 1a and 1b are schematic graphs of typical thermal shock test behavior.
Figure 1B:
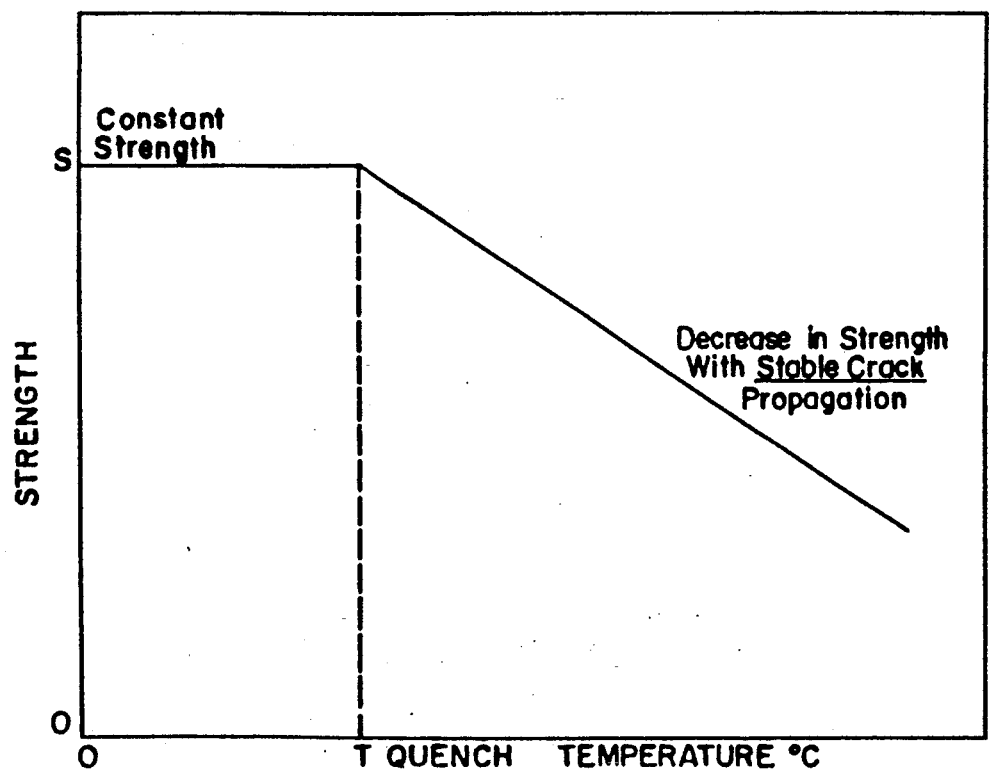

The materials from which the extruded laminated articles of this invention are made may be any of the wellknown sinterable inorganic materials capable of providing mechanical strength and good thermal properties In the preferred embodiment, the materials are ceramic materials, but they may also be selected from cermet, metallic, glass and glass-ceramic materials.

Reference to suitable sinterable materials which can be used in this invention is made in U.S. Pat. Nos. 3,112,184, 3,444,925, 3,824,196, 3,885,977, 3,919,384, 3,963,504, 4,017,347 and 4,582,677, the disclosures of which are herein incorporated by reference. Examples of suitable materials include glasses, such as boro-silicates, soda-lime-silicates, lead-silicates, alumino-silicates, alkaline earth silicates, and fused silica, and oxide ceramics such as alumina, alumina-zirconia, thoria, spinels, titania, urania, rare earth oxides, calcium-aluminates, sillimanite, mullite, magnesia, zirconia, various silicates including cordierite, steatite, petalite, spodumene, fosterite, clay, zircon, talc and porcelain, various nitrides including silicon nitride, silicon oxynitrides, and aluminum nitride, various carbides including silicon carbide, boron carbide, titanium carbide and zirconium carbide, various borides, various zirconates, various titanates, various glass-ceramics, and mixtures or combinations of such materials.

The sinterable materials may also be selected from glass-ceramics or from sinterable ceramic and metal mixtures, e.g., chromium and alumina mixtures, to form cermets. Also suitable are sinterable metal powders, e.g., powders of Fe, Al, Cu, Ti, Zr, Ni, Cr, stainless steel, various other alloys and mixtures or combinations thereof. Additional examples of metal powders which can be sintered to form a sintered body are disclosed in U.S. No. 4,649,003, the disclosure of which is herein incorporated by reference.

The phases or layers of sinterable materials may optionally contain reinforcing whiskers, e.g., of alumina, silicon nitride or silicon carbide, or fibers, e.g., carbon fibers, as disclosed in U.S. No. 3,794,707 and U.S. No. 4,673,658.

The sinterable particulate or powdered ceramic, glass or glass-ceramic materials used in this invention may also optionally contain substantial amounts of a component which causes intracrystalline and intercrystalline microcracking to occur. Ceramic materials which contain such a component, and are therefore contemplated for use within the present invention, are disclosed in U.S. Pat. Nos. 3,528,831, 3,549,400 and 3,578,471, all issued to I. M. Lachman. A preferred microcracking agent or addition to the ceramic material is aluminum titanate, which is normally incorporated into a ceramic matrix as a "solid solution" with the basic ceramic material An aluminum titanate solid solution with mullite is disclosed in U.S. Pat. No. 4,483,944 to Day et al. The disclosures of the four above-mentioned patents are incorporated herein by reference.

The choice of materials from which the articles of this invention will be made is not necessarily critical, and the above-mentioned materials are recited solely for purposes of exemplification. As has been previously noted, it is preferred that the materials of the different laminated phases have differing thermal expansion and firing shrinkage properties to enhance microcracking. Naturally, it is also preferred that the sinterable materials of the layers not be reactive with one another to a degree so as to diminish the integrity of the discrete layers in the article.

The choice of materials will also, of course, depend upon the intended application of the article For example, the chemical resistance of the materials is a concern when the ultimate articles are intended for use in certain chemical processing application, e.g., silicon-based materials might be avoided in chemical processes utilizing reducing gases.

The sinterable materials of which each layer in the article is formed are separately formed into moldable bodies by mixing the constituent materials with an additional substance that binds those materials into a plasticized mass. This plasticizing/binding agent, can be any of the well-known materials commonly used in the ceramic art for such purposes. Suitable plasticizing-/binding agents are disclosed in:

Ceramics Processing Before Firing," ed by George Y. Onoda, Jr. & L. L. Hench, John Wiley & Sons, New York Study of Several Groups of Organic Binders Under Low-Pressure Extrusion, C.C. Treischel & E. W. Emrich, Jour. A. Cer. Soc., (29), pp. 129-132, 1946

Organic (Temporary) Binders for Ceramic Systems, S. Levine, Ceramic Age, (75) No. 1, pp. 39+, Jan. 1960

"Temporary Organic Binders for Ceramic Systems," S. Levine, Ceramic Age, (75) No. 2, pp. 25+, Feb. 1960

Preferred agents are methyl cellulose, polyvinyl alcohol or a silicone resin. The silicone resins preferred for use are described in U.S. Pat. No. 3,090,691 to Weyer. The most preferred binder is methyl cellulose, available as Methocel K75 from the Dow Chemical Company.

The sinterable particulate or powdered materials are separately mixed with sufficient plasticizing/binding agent to form a moldable mass. Generally, about 1–20 percent by weight, based on the sinterable particulate or powdered material weight, of the plasticizing/binding agent is used. Up to about 1 percent by weight, based upon the total body weight, of surfactant or lubricant such as sodium stearate can also be used to facilitate mixing and extruding. The mixing step can be performed wet or dry. Intensive mixing such as obtained with a Littleford Mixer is preferred, but other conventional mixing equipment can also be used. At some point in the fabrication process, usually after dry mixing, a liquid, preferably water, is added, which acts as a plasticizer. When the plasticizing/binding agent is a silicone resin, it is preferred to use isopropyl alcohol or equivalent solvent, in addition to water. Plasticizing is attained with the use of a mix muller or other commonly used shearing device.

The plasticized masses of sinterable particulate or powdered material are molded or formed into multiple discrete bodies such as rods, discs, spheres, cylinders, pellets, bars, ribbons or sheets. This is generally done by extrusion methods, but other methods such as tape casting, pressing, pug milling, slip casting and slurry filtering may also be used. See, e.g., Thompson, J.J., "forming Thin Ceramics," *Ceramic Bulletin*, Vol. 42, No. 9, page 480 (1963); and U.S. Pat. Nos. 2,966,719, 3,007,222 and 3,444,925, the disclosures of which are herein incorporated by reference. Such bodies of the first sinterable material ("first. bodies) are then intermingled with bodies of the second sinterable material ("second" bodies) to form an assembly suitable for coextrusion through a die to form a composite laminated article of the desired shape. The first and second bodies of sinterable material should be substantially uniformly distributed throughout the assembly and composite article Generally it is useful that the ratio of either of said bodies to the other will not exceed about 10:1 and more desirably 3:1. Preferably, the ratio of either of said bodies to the other will not exceed about 1.2:1, and, more preferably, the ratio of either of said bodies to the other is about 1:1. It is preferred that the size and shape of the first and second bodies of sinterable material be about the same.

Figure 2A:
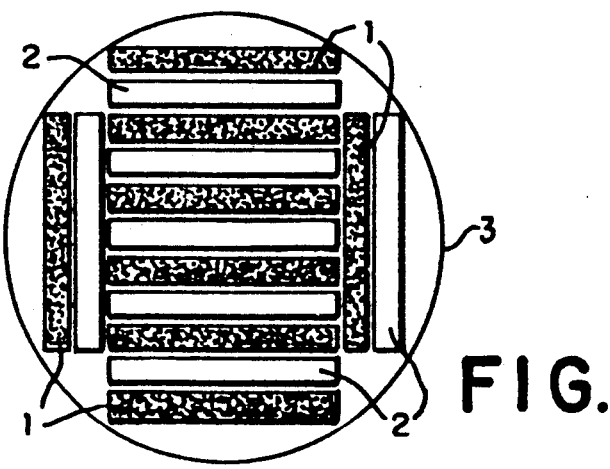
FIG. 2a is a schematic drawing of an end view of an extruder barrel having a typical assembly of composite bodies of first and second sinterable materials loaded therein prior to extrusion.
Figure 2B:
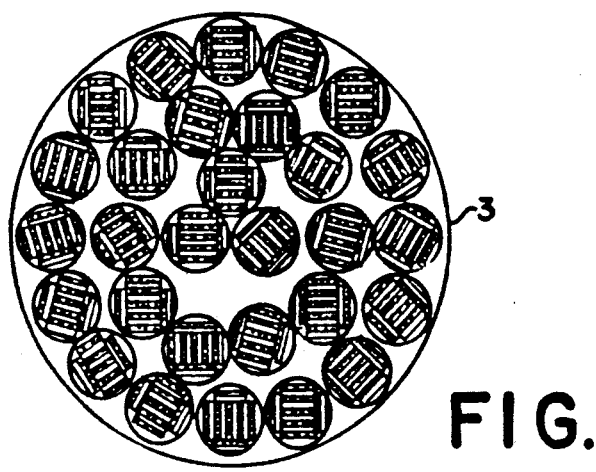
FIG. 2b is a schematic drawing of an end view of an extruder barrel having a typical assembly of once-extruded composites loaded therein.
Figure 2C:
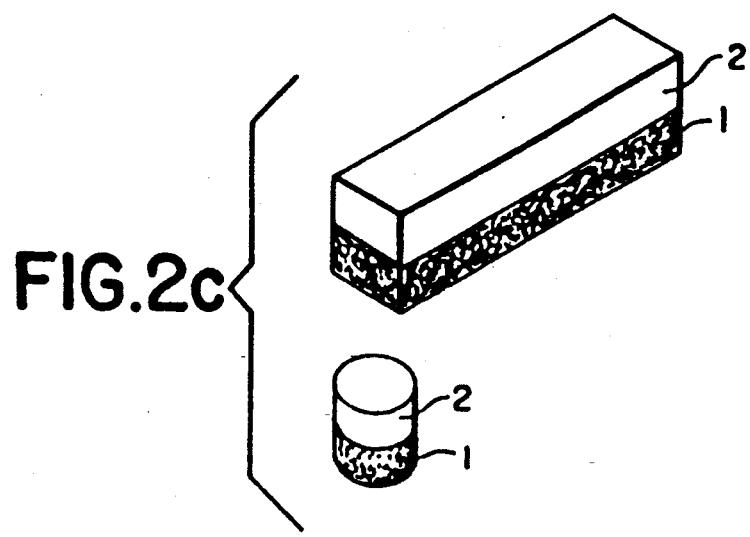
FIG. 2c is an illustration of composite body shapes of first and second sinterable materials which can be extruded into a laminated composite article of final desired shape.

The composite article so formed can be of any size or shape so long as the first and second bodies of sinterable material are substantially uniformly distributed throughout and are present therein in distinct phases and so long as the composite article can be extruded, if desired, through a die to form the article in its final desired shape. It is also to be understood that the manner of forming the composite article can be of any means by which these criteria are substantially met. For example, the first and second bodies of sinterable material can be molded together into a composite article in the shape of a sausage, sphere, bar or disc which is then extruded into the final monolith shape. FIG. 2c illustrates a bar and a disc of first and second bodies of sinterable material, 1 and 2, respectively. It is also possible, and preferred, to intermingle the bodies directly in the inlet barrel of the extruder, thus forming an assembly which can be immediately extruded thereafter, as shown in FIG. 2a.

Figure 2D:
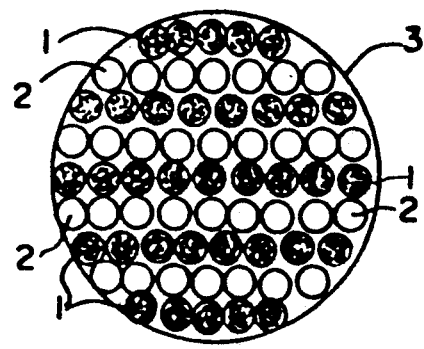
FIG. 2d is a schematic drawing of an end view of an extruder barrel having a typical assembly of rods, spheres or slugs loaded therein.
Figure 2E:
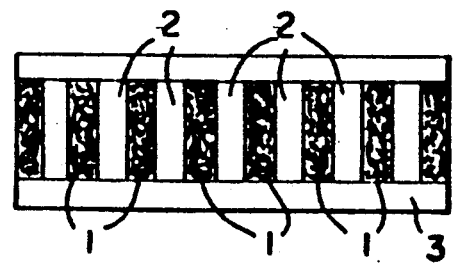
FIG. 2e is a schematic drawing of a crosssectional side view of an extruder barrel having an assembly of ribbons, sheets or discs layered therein perpendicular to the barrel axis.

FIGS. 2d and 2e illustrate how different geometrical assemblies can be oriented in the extruder barrel. FIG. 2d shows how rods, spheres or slugs of first and second sinterable materials, 1 and 2, could be assembled, e.g. by axially stacking in adjacent columns, in the extruder barrel 3 so that, after extrusion, a laminated composite article results. FIG. 2e shows how discs or sheets 1 and 2 can be layered in the barrel 3 of an extruder so that the plane of the disc is perpendicular to the axis of the extruder. This method of axially stacking will produce a type of laminated extrusion, especially if thin layers are used.

In a preferred embodiment of the present invention, the plasticized masses of first and second sinterable materials are separately extruded through a die into elongated shapes, preferably of rectangular, hexagonal or circular cross-section Preferably, the shapes and dimensions thereof are the same for each sinterable material. Also preferably, the plasticized sinterable materials are extruded as ribbons approximately 4 mm thick by 32 mm wide.

The extruded composite bodies are then assembled by intermingling the molded components axially or longitudinally. Most preferably, this will be done so that the ribbons are substantially parallel The extruded bodies are positioned to be substantially uniformly distributed throughout the assembly. As an example, FIG. 2a depicts the cross-section of an assembly of ribbons of the two phases of materials assembled longitudinally in the barrel, 3, of an extruder. First and second bodies of sinterable material, 1 and 2, respectively, are uniformly distributed through the assembly.

The composite so assembled is then itself preferably extruded through a rod die one or more times to reduce its own cross-sectional area and to effect further distribution of the two phases therein. A typical distribution of the composite bodies in a die head or extruder barrel 3 prior to reextrusion is illustrated in FIG. 2b. The distribution of the phases in the extruded article, e.g., the relative thicknesses of the layers, can be controlled not only by the number of extrusions performed but also on the initial size of the first and second bodies used to form the composite. It is convenient that extrusion be performed in a die that reduces the size of the cross-sectional area of the composite itself to that similar to one of the original constituent ribbons.

Figure 3:
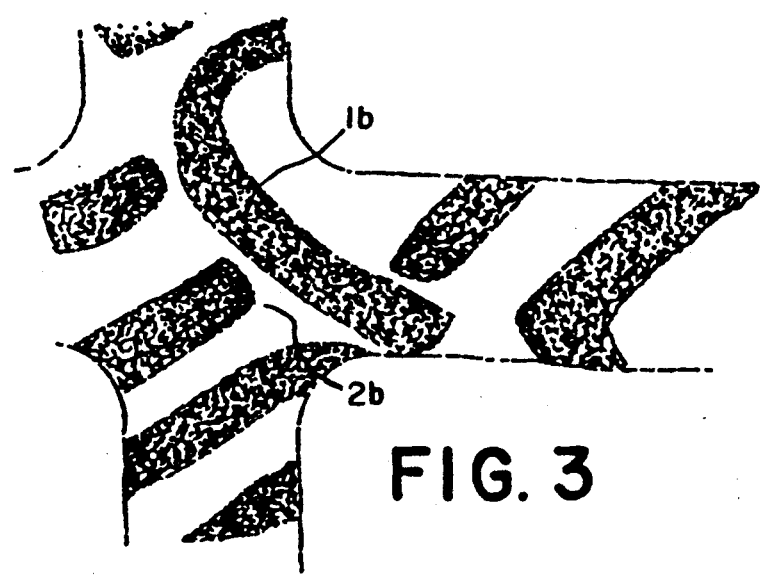
FIG. 3 is a schematic of a magnified view of a portion of the walls of a honeycomb structure showing the uniformly distributed layers of first and second sinterable materials.

Ultimately, the composite is extruded through a die to form the desired shape of the final article In one embodiment of the invention, the article so extruded is a honeycomb body or multichannel monolith having substantially parallel cells or passages extending between open end faces thereof. Typical honeycomb monoliths, for example, have 400 square cells per square inch with a wall thickness of 7 mils, or as another example, have 200 square cells per square inch with a wall thickness of 20 mils. FIG. 3 shows an enlarged portion of a honeycomb monolith formed by the extrusion of a composite as described above. Layers 1b of a first sinterable material are interspersed with layers 2b of a second sinterable material, and both such layers are substantially uniformly distributed throughout the article and both are substantially discontinuous. This is in contrast to the extruded monolithic catalyst supports prepared by extrusion and disclosed in U.S. No. 4,631,268. The articles disclosed therein were prepared by extrusion methods similar to those described above; however, the extrusion was carried out so that, rather than forming laminated phases o r layers, one of the sinterable materials, the catalyst-support phase, was embedded in the second sinterable material, a ceramic which formed a substantially continuous matrix phase.

Although the above description was limited to the preparation of an article having discrete phases of two sinterable materials, this invention is not intended to be so limited. Three or more sinterable materials may be combined using the general methods outlined above to form extruded laminated bodies according to this invention. In all cases, it is preferred that the varieties of sinterable materials be substantially uniformly distributed throughout the final article.

The extruded shapes are then heated to a temperature and for a time sufficient to sinter the particulate or powdered materials. Optionally, this heating/sintering step is preceded by drying the shapes at about 100°-120° C. It is then preferred to burn out the temporary binders in the range of 250°-500° C. The heating/sintering step generally takes place above 800° C., although when silicone resin is used as a binder for the ceramic matrix, temperatures as low as 500° C. may be sufficient. The maximum firing temperature is limited by the melting points of the constituents in the compositions.

Aspects of this invention are illustrated, but not limited by, the following examples. In these examples, test results were obtained using the following:

Flexural Strength - ASTM Test No. C—158—84
Thermal Expansion - ASTM Test No. E831—81
Modulus of Elasticity - ASTM Test No. C326—82
Bulk Density - Volume computed from measurements of the physical dimensions of a bar and weighed dry for final computation of the bulk density.

EXAMPLE

Five laminated extruded articles were made according to this invention using the materials as set forth in Table 1. In each example, equal amounts of components A and B were used to prepare the extruded articles.

TABLE 1

| Example | Component A | Component B |
|---------|-------------|-------------|
| 1 | 62.9% alumina | 96.0% alumina |
|   | 37.1% calcium carbonate | 2.7% manganese carbonate |
|   |   | 1.3% titania |
| 2 | 100% alumina* | 77.0% alumina |
|   |   | 19.0% zirconia |
|   |   | 2.7% manganese carbonate |
|   |   | 1.3% titania |
| 3 | 50.0% alumina | 96.0% alumina |
|   | 40.0% calcined clay | 2.7% manganese carbonate |
|   | 10/0% kaolin clay | 1.8% titania |
| 4 | 50.0% alumina | 87.0% alumina |
|   | 40.0% calcined clay | 9.0% zirconia |
|   | 10.0% kaolin clay | 2.7% manganese carbonate |
|   |   | 1.3% titania |
| 5 | 50.0% alumina | 77.0% alumina |
|   | 40.0% calcined clay | 19.0% zirconia |
|   | 10.0% kaolin clay | 2.7% manganese carbonate |
|   |   | 1.3% titania |

*Alcoa T-61 —325 mesh; all other aluminas Alcan C-701 RGE
Baker reagent calcium carbonate #1294
Fisher manganese carbonate M-85
Baker reagent titania #4162
Zircoa A-grain zirconia
Georgia-Kaolin Glomax-LL calcined kaolin clay
Georgia-Kaolin Hydrite-MP kaolin clay In each example, the dry powders were mixed in a Model M5G Littleford dry blender for three minutes. The Model M5G is a plow oriented blender which thoroughly mixes the powders without changing particle size or increasing batch temperature due to friction. Methylcellulose (Dow K75, 4% in Examples 1 and 2, 6% in Examples 3, 4 and 5), a temporary binder, and, in Examples 1 and 2, 1% sodium stearate lubricant were mixed with the other dry materials.

All compositions were wet mulled using a Lancaster counter current batch mixer type PC. Water was introduced during this process and all batches were mulled between 15 to 20 minutes for good plasticity and homogeneity of the materials. After mulling, the batch consistency had an appearance of crumbs to small, flat chunks that were somewhat soft and plastic.

Extrusion of the samples were conducted on a 20 ton Wahlco extrusion press with a barrel diameter of 2.626" and maximum hydraulic pressure of 2500 psi. The fabrication process was a multi-step procedure. It involved extruding two separate compositions in the form of ribbon 4 mm thick by 32 mm wide (0.157"×1.25"). This ribbon was then alternately stacked in the barrel of the extruder and pushed into an intermediate shape of a 5.2 mm rod (0.205"diameter). With a successive extrusion, the laminations could be reduced to a desired thickness. Shapes extruded for this study included 8 mm rods for firing shrinkage, flexural strength, axial thermal expansion, mercury porosity and Hasselman thermal shock testing; 5 mm×15 mm bars for modulus of elasticity measurements; 1"diameter, 400 cells/in$^2$ honeycomb for laboratory thermal shock testing and evaluation.

All samples were dried in a steam-like atmosphere at 100° C. for three days and then fired in a Bickley gas-air furnace at the various designated temperatures Testing of Examples 1 and 2

Physical property results for shrinkage, strength and thermal expansion for each component of the laminated articles of Examples 1 and 2 and for the laminated articles themselves are presented in Table 2.

TABLE 2

|  | Firing Temp. °C. 6hrs. | % Shrink | Flexural Str. psi | Thermal Exp.* |
|---|---|---|---|---|
| Example 1 | 1500 | −4.4 | 1770 | 62.4 |
|  | 1600 | −2.5 | 1810 | 64.6 |
|  | 1650 | −1.7 | 2600 | 64.6 |
| Component A | 1500 | 4.5 | 5020 | 55.8 |
|  | 1600 |  |  |  |
|  | 1650 | 16.1 |  | 22.6** |
| Component B | 1500 |  |  |  |
|  | 1600 | 17.1 | 19700 |  |
|  | 1650 | 17.2 | 15300 | 80 |
| Example 2 | 1400 |  |  |  |
|  | 1500 | 11.9 | 11300 | 80.5 |
|  | 1600 | 12.3 | 6050 | 81.0 |
|  | 1650 | 12.5 | 7000 | 80.5 |
| Component A | 1400 | 1.6 | 3400 |  |
|  | 1500 | 4.2 | 8000 |  |
|  | 1600 | 6.4 | 10000 | 80 |
| Component B | 1400 | 15.7 | 15200 | 81.4 |
|  | 1500 | 17.1 | 6200 | 79.4 |
|  | 1600 | 16.9 | 4300 | 80.0 |
|  | 1650 | 16.7 | 3600 | 78.1 |

*in./in./°C., (25° C.-1000° C.)
**Sample @ 1650° C. began to melt.

The data in Table 2 indicate that, in the case of the calcium-aluminate laminated composition, Example 1, the firing shrinkabe is actually an expansion (+2.5% @1600° C.), resulting in very low strengths (1800 psi @1600° C). Example 2, the extruded laminated composition with alumina and zirconia, has higher strengths (6000 psi @1600° C.) but also higher axial thermal expansion (81.0×10$^{-7}$ @1600° C.).

The samples of Example 1 and 2 were also tested for thermal shock resistance using the Hasselman test. Samples previously fired at 1600° C. for six hours were chosen for the test. The dimensions of the test samples were ¼" diameter ×4"long, and they were tested over a range of quench temperatures, 200° C. to 1000° C., at 100° increments. Four rods were used at each quench temperature with a new set of rods being used at each succeeding temperature. Samples were held at temperature for fifteen minutes and then quenched in cold water. Tested rods were then dried and submitted for room temperature modulus of rupture. The strength results for the thermal shock tested samples are shown in FIG. 4. As these data indicate, the material of Example 2 has good thermal shock resistance because of its rather stable crack propagation The material of Example 1 is much weaker and displays signs of being less stable.

Testing of Examples 3, 4 and 5

Physical property results for shrinkage, strength and thermal expansion for each component of the laminated articles of Examples 3, 4 and 5 and for the laminated articles themselves are presented in Table 3.

TABLE 3

| | Firing Temp. °C. 6hrs. | % Shrink | Flexural Str. psi | Thermal Exp.* |
|---|---|---|---|---|
| Example 3 | 1400 | 4.8 | 6970 | 73.4 |
| | 1500 | 9.6 | 8100 | 68.2 |
| | 1600 | 15.0 | 15000 | 63.9 |
| | 1650 | 15.4 | 16733 | 70.0 |
| Component A | 1400 | 5.0 | 6890 | 59.5 |
| | 1500 | 3.7 | 5530 | 49.2 |
| | 1600 | 6.3 | 7670 | 46.3 |
| | 1650 | 10.2 | 11000 | 46.3 |
| Component B | 1600 | 17.1 | 19700 | |
| | 1650 | 17.2 | 15300 | 80 |
| Example 4 | 1400 | 4.9 | 7210 | 69.6 |
| | 1500 | 10.8 | 12100 | 67.8 |
| | 1600 | 14.5 | 18600 | 64.5 |
| | 1650 | 14.5 | 17350 | 62.0 |
| Component A** | | | | |
| Component B | 1600 | 17.4 | 4560 | |
| | 1650 | 16.7 | 2800 | 80 |
| Example 5 | 1400 | 4.7 | 8660 | 69.7 |
| | 1500 | 10.6 | 14800 | 60.7 |
| | 1600 | 13.7 | 27400 | 64.3 |
| | 1650 | 14.0 | 22900 | 65.5 |
| Component A** | | | | |
| Component B | 1400 | 15.7 | 15200 | 81.4 |
| | 1500 | 17.1 | 6170 | 79.4 |
| | 1600 | 16.9 | 4250 | 80.0 |
| | 1650 | 16.4 | 3640 | 78.1 |

*in./in./ °C., (25° C.–1000° C.)
**Same as component A in Example 3.

Axial thermal expansion was in the range of 60–70×10$^{-7}$ @10000° C. for all the compositions of the all three examples. The laminated layers of the mullite extruded laminated series of Examples 3–5 fired at both 1500° C. and 1650° C. are very distinctive in photomicrographs of the articles.

"As fired" (@1600° C.) modulus of rupture measurements were performed for the articles of Examples 3–5. The results are presented in Table 4 and indicate that strengths increase with the increasing percent of zirconia.

TABLE 4

| Example | Room Temp. MOR. psi | % ZrO$_2$ |
|---|---|---|
| 3 | 1500 | 0 |
| 4 | 18600 | 9 |
| 5 | 27400 | 19 |

Modulus of elasticity measurements were conducted on fired bars 0.110" thick ×0.475" wide ×5.0" long) for the compositions of Examples 2–5, the composition of Example 1 being too weak to test. The results, in Table 5, show rather low values indicating that microcracking has occurred. It is estimated that the examples in Table 5 would have room temperature modulus of elasticity values of 40×10$^6$ psi or more if there were no microcracking. The results also indicate that for the mullite-alumina series (Examples 3–5) a gradual decrease in modulus of elasticity occurred as the amount of zirconia increased, with a much lower reading for the alumina laminated sample It is believed that increasing zirconia content would increase microcracking, thereby lowering the modulus of elasticity.

TABLE 5

| Example | Modulus of Elasticity, psi | Bulk Density, g/cm$^3$ |
|---|---|---|
| 2 | 11.81 | 3.661 |
| 3 | 26.26 | 3.018 |
| 4 | 23.62 | 3.112 |
| 5 | 22.95 | 3.103 |

Figure 5:
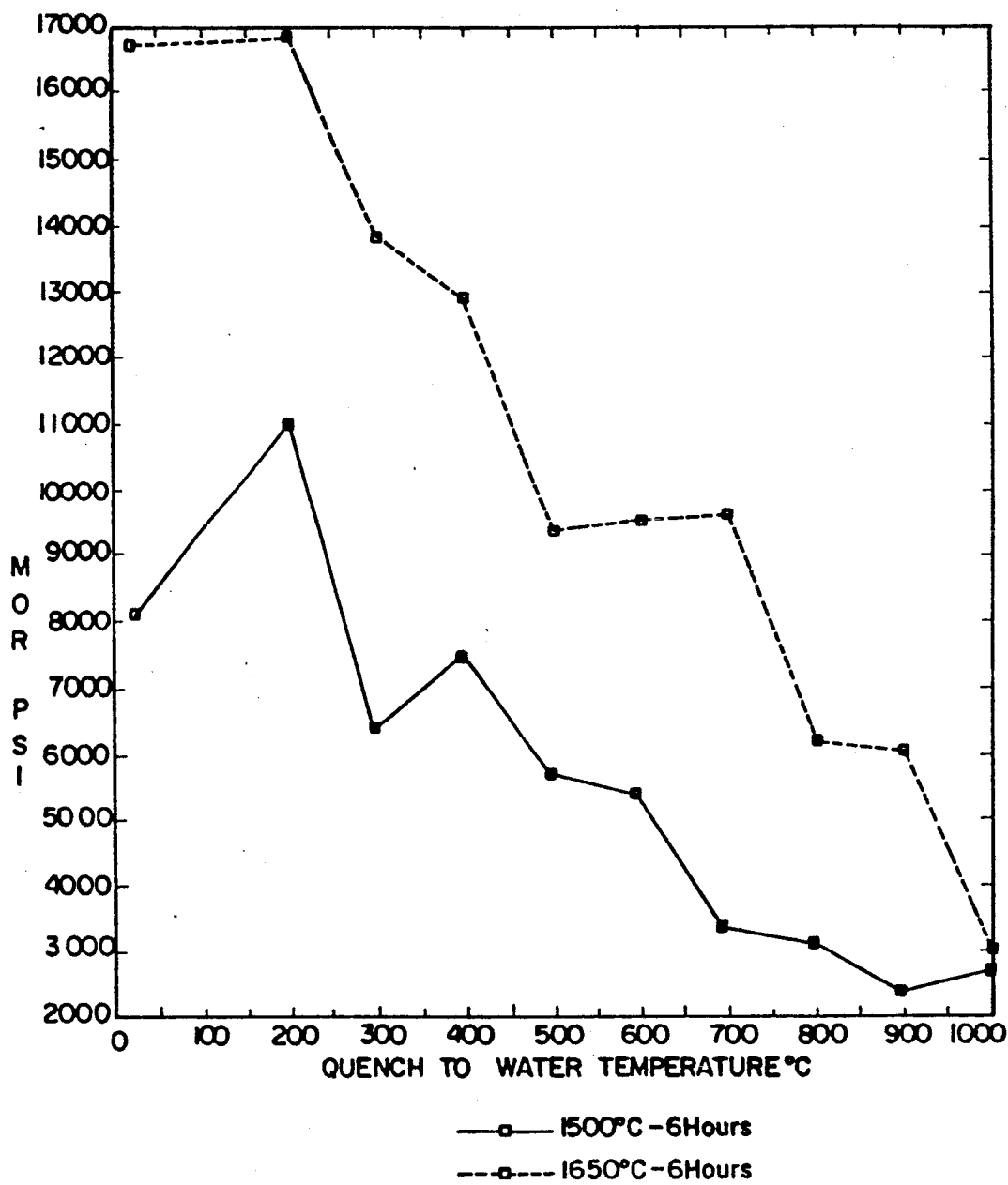
FIGS. 5, 6 and 7 are graphs presenting the results of Hasselman thermal shock testing of Examples 3, 4 and 5, respectively.
Figure 6:
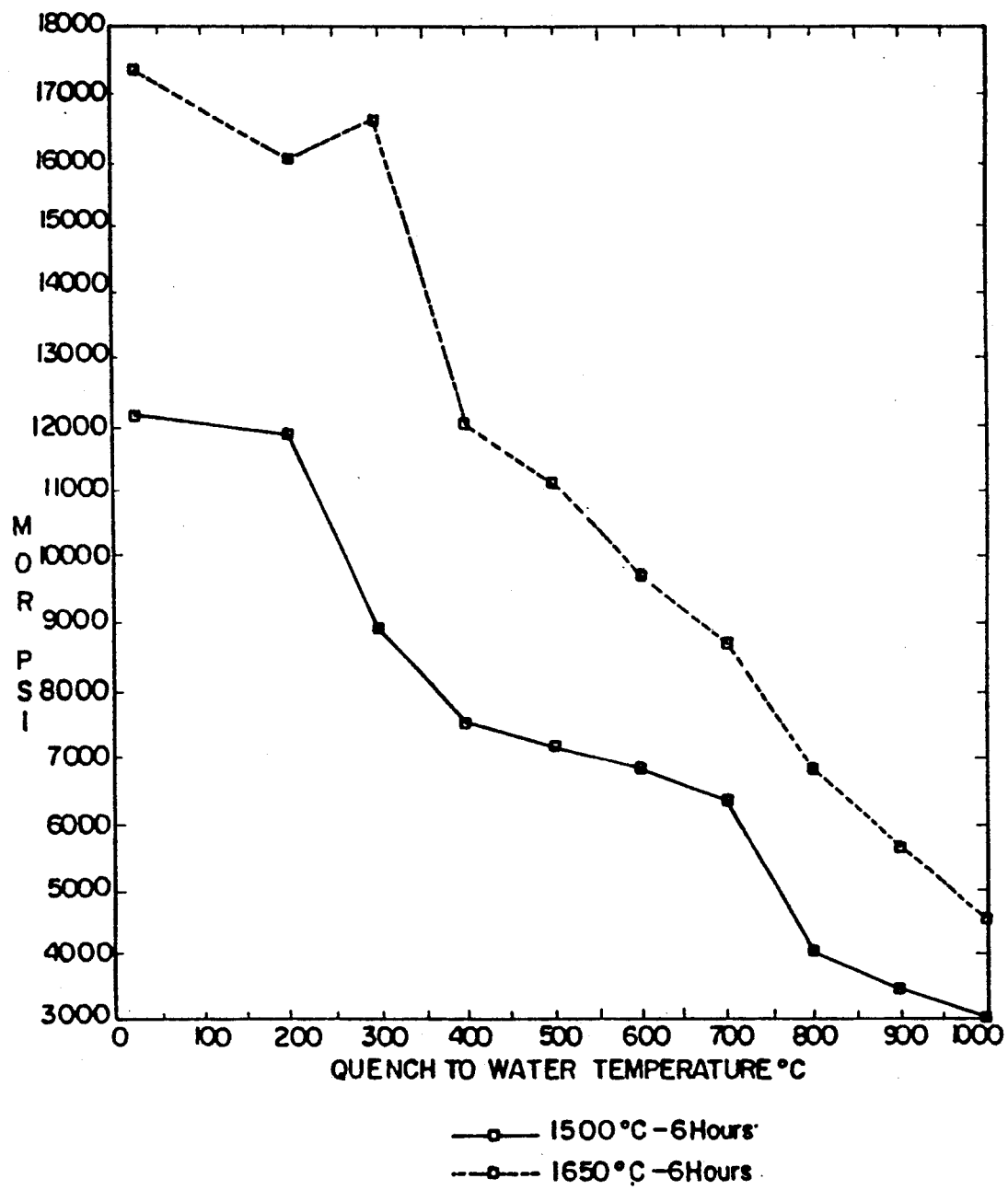
Figure 7:
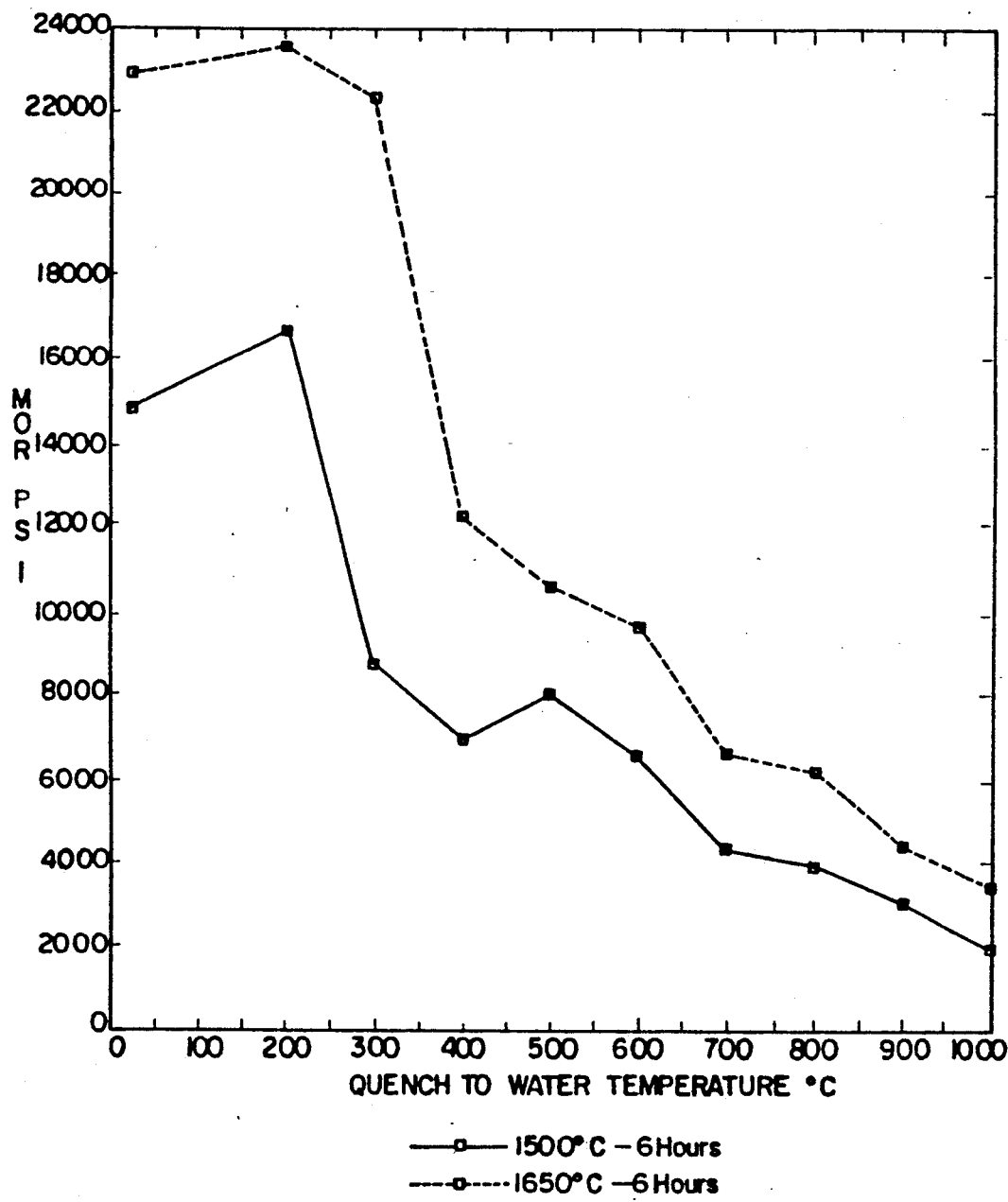

The Hasselman thermal shock test was conducted on laminated extruded rods of Examples 3–5 which had been fired at both 1500° C. and 1650° C. for 6 hours. The results are graphically illustrated in FIGS. 5, 6 and 7 and make apparent the differences between the 1500° C. and 1650° C. firings. Good strength remains at the lower end of the test quench temperature (200°–400° C.) and then a general decrease in strength with increasing quench temperature. Although the strength decrease is substantial over the whole range of the Hasselman thermal shock test, the results appear to indicate stable rather than catastrophic crack propagation.

What is claimed is:

1. A method producing a sinterable extruded laminated article comprising
   (a) providing first multiple bodies comprising a mixture of a first sinterable material and a plasticizing-/bonding agent for said material;
   (b) providing second multiple bodies comprising a mixture of a second sinterable material and a plasticizing/bonding agent for said material,
   where said first and second sinterable materials are different and are selected from particulate or powdered materials capable of being sintered to form high strength materials;
   (c) intermingling said first and second multiple bodies in a ratio of either of said first or second sinterable materials to the other of no greater than about 1.2:1 to form an assembled body and in such a manner that, after coextrusion of said assembled body to produce said sinterable extruded laminated article, said first and second sinterable materials are present in said article in multiple, discrete, substantially discontinuous, interspersed layers which are substantially uniformly distributed throughout said article;
   (d) passing said assembled body for extrusion through a die to form said sinterable extruded laminated composite article in a desired shape having said layers.

2. The method of claim 1 wherein the ratio of either of said first or second sintered materials to the other is about 1:1.

3. The method of claim 2 where said sinterable extruded laminated article is fired to a high strength article.

4. A method of producing a high strength extruded laminated composite article comprising heating a sinterable extruded laminated composite article prepared by the method of claim 2 to sinter the particulate or powdered materials therein.

5. The method or claim 1 wherein said first or second sinterable materials are independently selected from the group consisting of ceramics, glass-ceramics, glasses, cermets, metals, and mixtures and combinations thereof.

6. The method of claim 5 where said sinterable extruded laminated article is fired to a high strength article.

7. The method of claim 5 wherein said first and second sinterable materials have different firing shrinkages.

8. The method of claim 7 wherein said sinterable extruded laminated article is fired to a high strength article.

9. A method of producing a high strength extruded laminated composite article comprising heating a sinterable extruded laminated composite article prepared by the method of claim 7 to sinter the particulate or powdered materials therein.

10. The method of claim 1 where a plurality of said sinterable extruded laminated composite composite articles are intermingled and reextruded by being passed through a die to form a second sinterable extruded laminated composite article in a desired shape.

11. The method of claim 10 where said sinterable extruded laminated article is sired to a high strength article.

12. The method of claim 10 where said reextrusion step is repeated.

13. The method of claim 12 where said sinterable extruded laminated opposite article si fired to a high strength article.

14. The method of claim 1 where said sinterable extruded laminated article is fired to a high strength article.

15. The method of claim 1 where said sinterable extruded laminated article is fired to a high strength article.

16. A method of producing a high strength extruded laminated composite article comprising heating a sinterable extruded laminated composite article prepared by the method of claim 1 to sinter the particulate or powdered materials therein.

* * * * *

UNITED STATES PATENT AND TRADEMARK OFFICE
CERTIFICATE OF CORRECTION

PATENT NO. : 5,053,092
DATED : October 1, 1991
INVENTOR(S) : Irwin M. Lachman It is certified that error appears in the above-identified patent and that said Letters Patent is hereby corrected as shown below:

Column 1, line 31, -- Refe- --
should read -- Ref- --.

Column 2, line 15, -- articles --
should read -- articles. --.

Column 2, line 58, -- article --
should read -- article. --.

Column 3, line 3, -- propagation --
should read -- propagation. --.

Column 4, line 36, -- article --
should read -- article. --.

Column 5, line 29, -- "first. --
should read -- "first" --.

Column 5, line 35, -- article --
should read -- article. --.

Column 6, line 18, -- parallel --
should read -- parallel. --.

Column 6, line 41, -- article --
should read -- article. --.

UNITED STATES PATENT AND TRADEMARK OFFICE
CERTIFICATE OF CORRECTION

PATENT NO. : 5,053,092

DATED : October 1, 1991

INVENTOR(S) : Irwin M. Lachman

Page 2 of 3

It is certified that error appears in the above-identified patent and that said Letters Patent is hereby corrected as shown below:

Column 8, line 28,
-- temperatures -- should read
-- temperatures. --.

Column 8, line 60, -- shrinkabe --
should read -- shrinkage --.

Column 9, line 13,
-- propagation -- should read
-- propagation. --.

Column 9, line 49, -- int he --
should read -- in the --.

Column 9, line 50, -- 10000°C. --
should read -- 1000°C. --.

Column 9, line 50, eliminate the
word -- the -- after the word "of".

Column 9, line 68, -- 0.110" --
should read -- (0.110" --.

Column 10, line 11, -- sample --
should read -- sample. --.

UNITED STATES PATENT AND TRADEMARK OFFICE
CERTIFICATE OF CORRECTION

PATENT NO. : 5,053,092
DATED : October 1, 1991
INVENTOR(S) : Irwin M. Lachman

It is certified that error appears in the above-identified patent and that said Letters Patent is hereby corrected as shown below:

Column 12, line 10, -- si -- should read -- is --.

Signed and Sealed this

Twenty-eighth Day of June, 1994

Attest:

BRUCE LEHMAN

Attesting Officer    Commissioner of Patents and Trademarks